Dec. 12, 1933.                A. B. MOULTON                1,938,664
                          ELECTRON TUBE CIRCUITS
                          Filed Jan. 11, 1927          2 Sheets-Sheet 1

INVENTOR
A. B. MOULTON
BY Ira J. Adams
ATTORNEY

Patented Dec. 12, 1933

1,938,664

UNITED STATES PATENT OFFICE 1,938,664

ELECTRON TUBE CIRCUITS

Albert B. Moulton, Riverhead, N. Y., assignor to Radio Corporation of America, a corporation of Delaware Application January 11, 1927. Serial No. 160,328

11 Claims. (Cl. 179—171)

This invention relates to electron tube circuits, and more particularly to circuits not adversely affected by natural tube capacitance, even at very high frequencies.

In attempting to use the neutralization schemes of Rice and Hazeltine in short wave apparatus, difficulty is experienced in obtaining a true balance. An object of my invention is to provide neutralization of tube capacities which will be effective even at extremely high frequencies. Considering the capacities other than the grid-plate capacity inherent in an electron tube I have succeeded with an additional balancing condenser in making the divided circuits previously known in the art more perfectly symmetrical and neutralized.

A grid-plate neutralizing condenser should not only duplicate the natural grid-plate capacitance in magnitude, but should, if possible, introduce an equivalent phase change. This I help accomplish by utilizing the anode of the tube as a plate which is common to both the natural grid-plate condenser and the grid-plate neutralizing condenser.

I further propose to use the cathode of the tube as a plate which is common to the capacitance between it and another electrode and the additional balancing condenser already mentioned, for this capacitance.

And finally I am able to combine the neutralizing condenser and the balancing condenser into a single element, and to do this is a still further object of my invention.

A difficulty experienced when working with very high frequencies is that the tube capacities in shunt with the plate impedance so reduce the latter that much of the amplification effect is lost. It is another object of my invention to overcome this difficulty, and this I do by tuning the plate inductance to be in resonance with the inherent tube capacities at the desired frequencies.

A further object of my invention is to produce a one way repeater which is almost perfect in its action although utilizing but a single tube. By compensating not only for all of the tube capacities but also for the tube resistance under normal operating conditions, I obtain a network which is so nearly symmetrical that it acts very effectively as a one way repeater.

The invention is described in connection with the accompanying drawings, in which Figure 1 shows the application of a balancing condenser to a neutralized circuit the input of which is divided;

Figure 6:
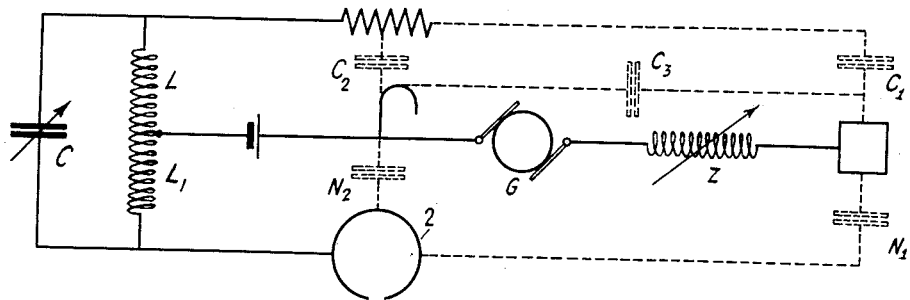
Figure 7:
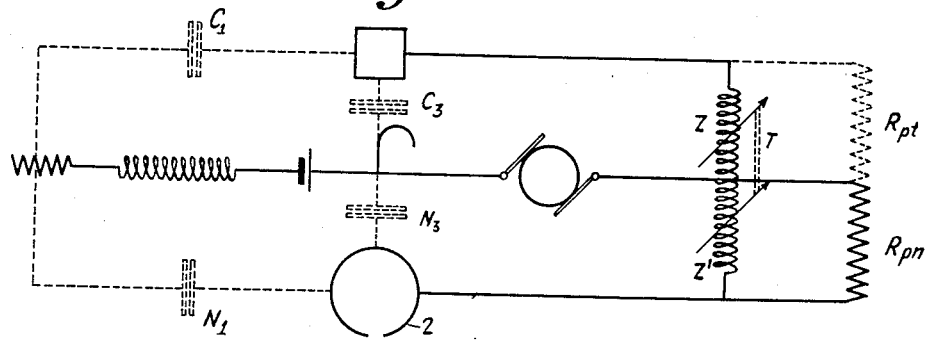

Figure 6 provides for tuning the output circuit;

Figure 7 is a wiring diagram of an efficient one way repeater made in accordance with my invention.

Figure 1:
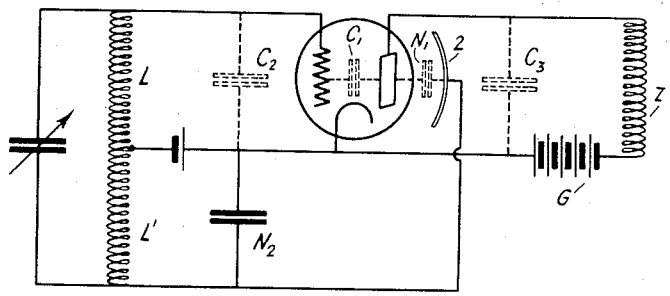
Figure 3:
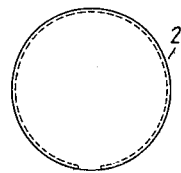
Figure 3 is a plan view of the same.

Referring to Fig. 1, the condenser $c_1$, $c_2$, and $c_3$, represent the inherent tube capacities, and are intended to represent not merely the capacitance between the individual tube elements themselves, but rather the actual total capacitance between the leads to the grid and plate, the filament and grid, or the filament and plate, with the tube set up for actual operation. This broader meaning is to be applied to the terminology of the claims also.

In Fig. 1 the inductance $L'$ is equal to the inductance $L$, and the neutralizing condenser $N_1$ is equal to the grid-plate capacitance $c_1$. This arrangement was found effective at moderate frequencies, but at very high frequencies it was impossible to obtain a balance. This, I have found, is because the capacitance $c_2$, in parallel with the inductance $L$, spoils the symmetry of the divided circuit, making it impossible for $L'$ and $L$ to counteract perfectly. By adding the balancing condenser $N_2$, which is of the same magnitude as the capacitance $c_2$, I have overcome the difficulty. The only remaining tube capacitance is $c_3$, and this merely serves to alter the effective value of the impedance $z$.

Figure 2:
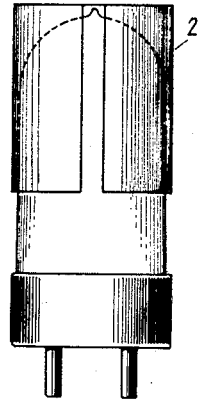
Figure 2 illustrates a metallic split cylinder combined with a tube to obtain neutralizing capacitance.

This figure also shows another feature of my invention, which is the use of the anode of the tube as a common plate for both condensers $C_1$ and $N_1$. Structurally this may preferably be embodied as shown in Fig. 2 in the form of a split cylinder 2 which surrounds the tube and is frictionally engaged by it. The magnitude of the capacitance may be adjusted by sliding the cylinder vertically upon the tube. Almost any form of metallic surface near the tube will do.

It is also possible to make a tube with an extra internal element. This necessitates another lead from the tube, and makes adjustment difficult.

Figure 4:
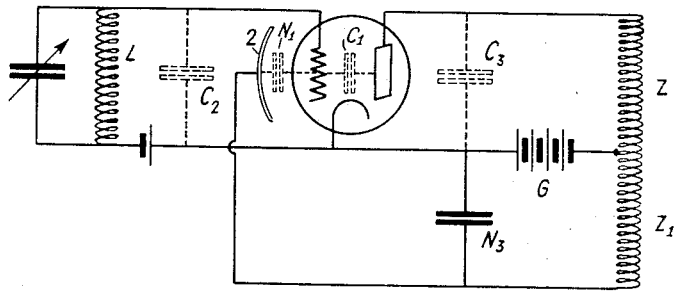
Figure 4 shows the application of a balancing condenser to a neutralized circuit the output of which is divided.

Fig. 4 is similar to Fig. 1 except that a divided output circuit is employed. In this case, the balancing condenser is $N_3$, and is approximately equal to the plate-filament capacitance $c_3$, which, if unbalanced, modifies the impedance $z$, so making neutralization impossible. In Fig. 4 it will be seen that the capacitance $c_2$ now serves to modify the input inductance L.

Now in Fig. 1, $N_2$ should equal $C_2$ if a usual separate neutralizing condenser is used for $N_1$. But using my type of neutralizing condenser introduces a natural capacitance between the filament and the split cylinder 2, as a result of which the balancing condenser $N_2$ may be less in value than $C_2$. The same applies to the balancing condenser $N_3$ in Fig. 4.

By suitable adjustment it is possible, with some tubes, to obtain the desired capacitance for both neutralizing and balancing condensers. Such an arrangement has been indicated in Figs. 5 and 6.

Even where both capacitance values cannot be made exactly right, and no balancing condenser $N_2$ or $N_3$ is used, it is clear that conditions will be much better with my cylinder 2 than if a separate neutralizing condenser were used for $N_1$.

The circuit of Fig. 1 has been redrawn in slightly different form in Fig. 6. An inspection of this figure shows that the inherent tube capacitances $c_1$, $c_2$, $c_3$, and the balancing condensers $N_1$, $N_2$, all serve to form paths in parallel with the plate impedance $z$. At very high frequencies this effect will cause a marked reduction in the amplification factor of the tube. If the inductance $z$ is so chosen that it will be in resonance with the capacity network, this difficulty may be overcome. For a limited range of frequencies a fixed inductance may be used, but a wider range will, of course, require a variable inductance, and this has been indicated by the arrow on the inductance $z$ in Fig. 6.

If a divided output circuit is being employed, then both halves of the split inductance should preferably be simultaneously variable. This has been indicated by the arrows on $z$ and $z'$ in Fig. 7, which, it will be noted, are tied together by the member T.

Using a divided output circuit makes one way repeater action possible provided certain conditions are fulfilled. It is necessary that the inherent capacities be balanced in accordance with the foregoing disclosure. It is desirable that the characteristic of the tube in the range used be linear. A still further requirement is that the circuit be made perfectly symmetrical, and to help do this I add, in parallel with one-half of the divided impedance $z'$, a resistance the magnitude of which is such that it is equivalent to the average operating tube resistance in the other half of the circuit. Referring to Fig. 7, the condenser $N_1$ is a neutralizing condenser, $N_3$ is a condenser to balance the effect of the plate-filament capacitance $c_3$, and $R_{pn}$ is a resistance in parallel to the impedance $z'$ to balance the effect of the tube resistance $R_{pt}$.

Figure 5:
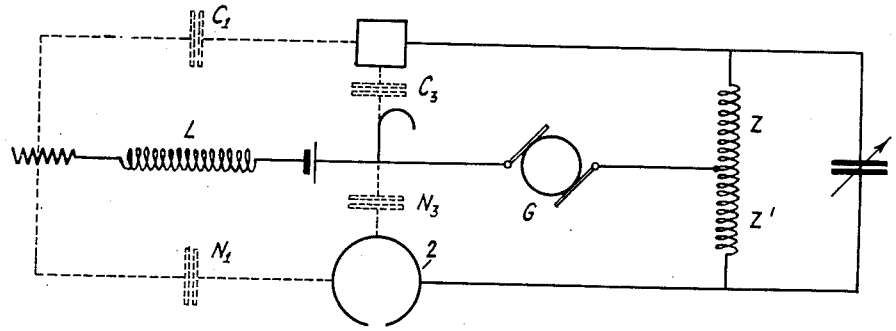
Figure 5 represents an arrangement wherein the two neutralizing capacitances are combined.

A comparison of Figs. 1 and 4, or of Figs. 5 and 6, will make evident the fact that in the case of a divided input circuit the conductive surface is, in a sense, equivalent to the control electrode of the tube, whereas in the case of a divided output circuit the conductive surface is equivalent to the anode of the tube. In both cases the feed back energy and the neutralizing energy are applied in perfect phase opposition.

What I claim is:

1. In combination, an electron tube, an input circuit, and an output circuit, one of said circuits being divided and containing a neutralizing condenser to counteract the grid-plate capacitance of the tube, the magnitude of the output circuit impedance being such that in combination with the natural tube capacitances alone the output circuit is tuned to the desired frequency.

2. In combination, an electron tube, an input circuit, an output circuit, one of said circuits being divided and containing a neutralizing condenser to counteract the grid-plate capacitance of the tube, the output circuit impedance being variable and of such magnitude that in combination with the natural tube capacitance alone the output circuit may be tuned to the desired frequency.

3. A one way repeater comprising an electron tube, an input circuit, a divided variable output impedance of such magnitude that in combination with the natural tube capacitance the output circuit may be tuned to the desired frequency, a neutralizing condenser to counteract the grid-plate capacitance of the tube, and a resistance equivalent to the average operating tube resistance connected across one part of the divided impedance.

4. The combination with an electron tube having an anode and a control electrode, of a conductive surface so positioned relatively thereto that the capacitance between the surface and one of the said electrodes is equal to the capacitance between the anode and the control electrode.

5. The combination with a three electrode tube having an anode, a cathode, and a control electrode, of a conductive surface so positioned relatively thereto that the capacitance between the surface and the cathode is equal to the capacitance between the cathode and one of the other electrodes.

6. The combination with a three electrode tube having an anode, a cathode, and a control electrode, of a conductive surface so positioned relatively thereto that the capacitance between the surface and the cathode is equal to the capacitance between the anode and the cathode.

7. The combination with a three electrode tube having an anode, a cathode, and a control electrode, of a conductive surface so positioned relatively thereto that the capacitance between the surface and the anode is equal to the capacitance between the anode and the control electrode, while the capacitance between the surface and the cathode is equal to the capacitance between the cathode and one of the other electrodes.

8. The combination with an electron tube and neutralizing circuits associated therewith of means to obtain a neutralizing capacitance comprising a metallic surface in the form of a split cylinder surrounding and frictionally adjustably engaging the envelope of the tube.

9. In a high frequency amplifier circuit comprising an electron discharge device having anode, cathode and grid electrodes, an inductance coil, a connection from an intermediate point of said inductance coil to said cathode and connections from opposite points on said coil to said grid and anode, one of said latter connections including a capacitance to neutralize the effect of capacity between the grid and anode, said capacitance comprising as one of its conductive surfaces one of the said electrodes.

10. In a high frequency amplifier circuit comprising an electron discharge device having anode, cathode and grid electrodes, an inductance coil, a connection from an intermediate point of said inductance coil to said cathode and connections from opposite points on said coil to said grid and anode, one of said latter connections including a capacitance to neutralize the effect of capacity between the grid and anode, said capacitance comprising as one of its conductive surfaces one of the said electrodes, a second capacitance connected between the cathode and that point on the coil which is connected to said first mentioned capacitance to balance the effect of capacity between the electrode which is connected to the opposite point of said coil and said cathode, said last named capacitance comprising as one of its conductive surfaces another one of said electrodes.

11. In a high frequency amplifier circuit comprising an electron discharge device having anode, cathode and grid electrodes, an inductance coil, a connection from an intermediate point of said inductance coil to said cathode and connections from opposite points on said coil to said grid and anode, one of said latter connections including a capacitance to neutralize the effect of capacity between the grid and anode, said capacitance comprising as one of its conductive surfaces one of the said electrodes and as another of its conductive surfaces means positioned adjacent said electron discharge device, a second capacitance connected between the cathode and that point on the coil which is connected to said last mentioned capacitance to balance the effect of capacity between the electrode which is connected to the opposite point on said coil and said cathode, said last named capacitance comprising as one of its conductive surfaces another one of said electrodes and as another of its conductive surfaces said means positioned adjacent said electron discharge device.

A. B. MOULTON.